(12) United States Patent
Malkireddy et al.

(10) Patent No.: US 12,499,162 B2
(45) Date of Patent: Dec. 16, 2025

(54) SYSTEM AND GRAPHICAL USER INTERFACE FOR GENERATING DOCUMENTS FROM REMOTE CONTENT ITEMS

(71) Applicant: Atlassian Pty Ltd., Sydney (AU)

(72) Inventors: Siddharth Reddy Malkireddy, San Francisco, CA (US); Alexander Hixon, New Castle (AU); Bhakti Mehta, Milpitas, CA (US); Ruslan Arkhipau, San Jose, CA (US); Igor Katkov, San Jose, CA (US); Venkatram Ramanathan, San Jose, CA (US); Kush Patel, San Francisco, CA (US); Niraj Agarwal, Santa Clara, CA (US); Christopher Davis, New Albany, IN (US); Ali Dasdan, Mountain View, CA (US)

(73) Assignee: ATLASSIAN PTY LTD., Sydney (AU)

( * ) Notice: Subject to any disclaimer, the term of this patent is extended or adjusted under 35 U.S.C. 154(b) by 166 days.

(21) Appl. No.: 18/374,598

(22) Filed: Sep. 28, 2023

(65) Prior Publication Data

US 2025/0110992 A1 Apr. 3, 2025

(51) Int. Cl.
  *G06F 16/93* (2019.01)
  *G06F 3/0482* (2013.01)
  *G06F 3/04845* (2022.01)

(52) U.S. Cl.
  CPC ............ *G06F 16/93* (2019.01); *G06F 3/0482* (2013.01); *G06F 3/04845* (2013.01)

(58) Field of Classification Search
  CPC ..... G06F 16/93; G06F 3/0482; G06F 3/04845
  See application file for complete search history.

(56) References Cited

U.S. PATENT DOCUMENTS

| | | | |
|---|---|---|---|
| 11,663,533 B2* | 5/2023 | Hughes | G06F 16/26 715/700 |
| 11,734,501 B1* | 8/2023 | Gui | G06F 16/986 715/256 |
| 2023/0101588 A1* | 3/2023 | Dasdan | G06F 40/134 715/234 |

* cited by examiner

*Primary Examiner* — Cao H Nguyen
(74) *Attorney, Agent, or Firm* — Brownstein Hyatt Farber Schreck, LLP

(57) ABSTRACT

A method may include causing a client computer to display a graphical user interface including a hierarchical element tree, the hierarchical element tree including a plurality of hierarchically arranged selectable elements. The method may further include, in response to receiving a selection of a selectable element in the hierarchical element tree and in accordance with the selected selectable element being associated with a remote content item that is managed by an external platform separate from the content collaboration system, selecting a content processing engine, retrieving content from the remote content item at the external platform and using an address associated with the remote content item, processing the content from the remote content item using the selected processing engine to produce renderable content, the renderable content formatted in accordance with the platform-specific structured data format, and causing display of the renderable content in the content panel.

20 Claims, 10 Drawing Sheets

SYSTEM AND GRAPHICAL USER INTERFACE FOR GENERATING DOCUMENTS FROM REMOTE CONTENT ITEMS

TECHNICAL FIELD

The present disclosure is generally directed to a content collaboration system, and more particularly, to systems and methods for generating data objects for a content collaboration system from remote content items.

BACKGROUND

Modern electronic devices facilitate a myriad of uses, both for business and personal endeavors. For example, electronic devices like personal computers, tablets, and mobile phones, are used in both business and personal contexts for creating and storing documents, writing computer code, communicating with other individuals (e.g., via email, chat services, voice and video calls), and the like. Some modern enterprises use software systems to manage various digital items that are used for product development or other professional activities. For example, content collaboration systems may facilitate the creation, presentation, and management of user-generated documents.

SUMMARY

A method may include, in a content collaboration system including a plurality of user-generated documents, causing a client computer to display a graphical user interface including a content panel configured to display content of a selected content item, and a navigational panel including a hierarchical element tree, the hierarchical element tree including a plurality of hierarchically arranged selectable elements, each respective selectable element being selectable to cause display of respective content associated with the respective selectable element in the content panel. The method may include, in response to receiving a selection of a selectable element in the hierarchical element tree and in accordance with the selected selectable element being associated with a document that is managed by the content collaboration system, obtaining document content of the document from the content collaboration system, the document content formatted in accordance with a platform-specific structured data format, and causing display of the document content in the content panel. The method may further include, in response to receiving the selection of the selectable element in the hierarchical element tree and in accordance with the selected selectable element being associated with a remote content item that is managed by an external platform separate from the content collaboration system, selecting a content processing engine from a set of candidate content processing engines accessible to the content collaboration system, the content processing engine configured to process content from remote content items associated with the external platform, retrieving content from the remote content item at the external platform and using an address associated with the remote content item, processing the content from the remote content item using the selected processing engine to produce renderable content, the renderable content formatted in accordance with the platform-specific structured data format, and causing display of the renderable content in the content panel. The renderable content may have a different appearance, when displayed, than the remote content item.

The method may further include, in response to a user input moving the selectable element from a first position to a second position within the hierarchical element tree, modifying the hierarchical relationship between a data object associated with the selectable element and other content items associated with other selectable elements in the hierarchical element tree.

The method may further include, while the renderable content is displayed in the content panel, receiving user-generated content for display with the renderable content, and storing the user-generated content in association with the renderable content. The method may further include, in response to receiving the user-generated content, sending the user-generated content to the external platform, thereby causing the external platform to incorporate the user-generated content in the remote content item.

The method may further include, while the document content is displayed in the display panel, and in response to a request to edit the document, transitioning the content panel from a view mode to an edit mode, receiving a modification to the document in the content panel, and storing the modification in association with the document.

The remote content item may be a first remote content item, the external platform may be a first external platform, the content processing engine may be a first content processing engine, the renderable content may be first renderable content, each respective candidate content processing engine may be configured to process content from different respective external platforms, and the method may further include, in accordance with the selected selectable element being associated with a second remote content item that is managed by a second external platform separate from the content collaboration system, selecting a second content processing engine configured to process content from remote content items associated with the second external platform, retrieving content from the second remote content from the second external platform using an address associated with the second remote content item, processing the content from the second remote content item using the selected second processing engine to produce second renderable content, the second renderable content formatted in accordance with the platform-specific structured data format, and causing display of the second renderable content in the content panel.

Processing the content from the remote content item using the selected processing engine to produce renderable content may include identifying a content element from a plurality of content elements in the remote content item, extracting an address of the identified content element, and including the address of the identified content element in the renderable content to cause display of the identified content element in the content panel.

The renderable content may have a different appearance, when displayed in the graphical user interface of the content collaboration system, than the remote content item, when displayed in a graphical user interface of the external platform.

A method may include, in a content collaboration system including a plurality of user-generated documents formatted in accordance with a platform-specific structured data format, causing a client computer to display a graphical user interface including a content panel configured to display content of a selected content item, and a navigational panel including a hierarchical element tree, the hierarchical element tree including a plurality of hierarchically arranged selectable elements, each respective selectable element being selectable to cause display of respective content associated with the respective selectable element in the content panel. The method may further include, in response to receiving a document creation request, the document creation request including an address to a remote content item, the remote content item managed by an external platform separate from the content collaboration system and having a format other than the platform-specific structured data format, selecting a content processing engine from a set of candidate content processing engines associated with the content collaboration system, the content processing engine configured to process content from remote content items associated with the external platform, retrieving content from the remote content item at an address associated with the remote content item, processing the content from the remote content item using the selected processing engine to produce renderable content, the renderable content formatted in accordance with the platform-specific structured data format, generating a data object including the renderable content, and causing a selectable element associated with the data object to be displayed in the hierarchical element tree. The method may further include, in response to receiving a selection of the selectable element, obtaining the renderable content from the data object, and causing the renderable content to be displayed in the content panel. Selecting the content processing engine from the set of candidate content processing engines may include determining an identity of the external platform based at least in part on an address included in the document creation request.

Processing the content from the remote content item using the selected processing engine may include extracting a title from the remote content item and assigning the title from the remote content item as a title of the data object. The method may further include receiving a user-generated title for the data object and replacing the assigned title of the data object with the user-generated title.

The document creation request may be received while content of a local document that is managed by the content collaboration system is displayed in the content panel, the local document associated with a position in the hierarchical element tree, and the method may further include associating the data object with the position in the hierarchical element tree. The method may further include, in response to a user input moving the selectable element associated with the data object to a different position within the displayed hierarchical element tree, changing a hierarchical relationship between the data object and other documents in the content collaboration system.

The method may further include, while the renderable content is displayed in the content panel, receiving user-generated content for display with the renderable content and storing the user-generated content in association with the data object. The user-generated content may be at least one of a title, a text comment, or an image.

A computer system may include at least one processor, and at least one memory storing instructions, which when executed by the at least one processor, cause the at least one processor to perform operations. The operations may include causing a client computer to display a graphical user interface including a content panel configured to display content of a selected content item, and a navigational panel including a hierarchical element tree, the hierarchical element tree including a plurality of hierarchically arranged selectable elements, each respective selectable element being selectable to cause display of respective content associated with the respective selectable element in the content panel. The operations may include, in response to receiving a selection of a selectable element in the hierarchical element tree and in accordance with the selected selectable element being associated with a document that is managed by the content collaboration system, obtaining document content of the document, the document content formatted in accordance with a platform-specific structured data format, and displaying the document content in the content panel. The operations may further include, in response to receiving the selection of the selectable element in the hierarchical element tree and in accordance with the selected selectable element being associated with a remote content item that is managed by an external platform separate from the content collaboration system, selecting a content processing engine from a set of candidate content processing engines associated with the content collaboration system, the content processing engine configured to process content from remote content items associated with the external platform, retrieving content from the remote content item at an address associated with the remote content item, processing the content from the remote content item using the selected processing engine to produce renderable content, the renderable content formatted in accordance with the platform-specific structured data format, and displaying the renderable content in the content panel.

The selectable element in the hierarchical element tree may have a hierarchical relationship to other selectable elements in the hierarchical element tree, and the operations may further include, in response to a user input to move the selectable element within the hierarchical element tree, associating a data object associated with the selectable element with a different position in the hierarchical element tree.

The operations may further include, while the renderable content is displayed in the content panel, receiving user-generated content for display with the renderable content, and storing the user-generated content in association with the renderable content. The operations may further include, in response to receiving the user-generated content, sending the user-generated content to the external platform, thereby causing the external platform to incorporate the user-generated content in the remote content item.

Figure 1:
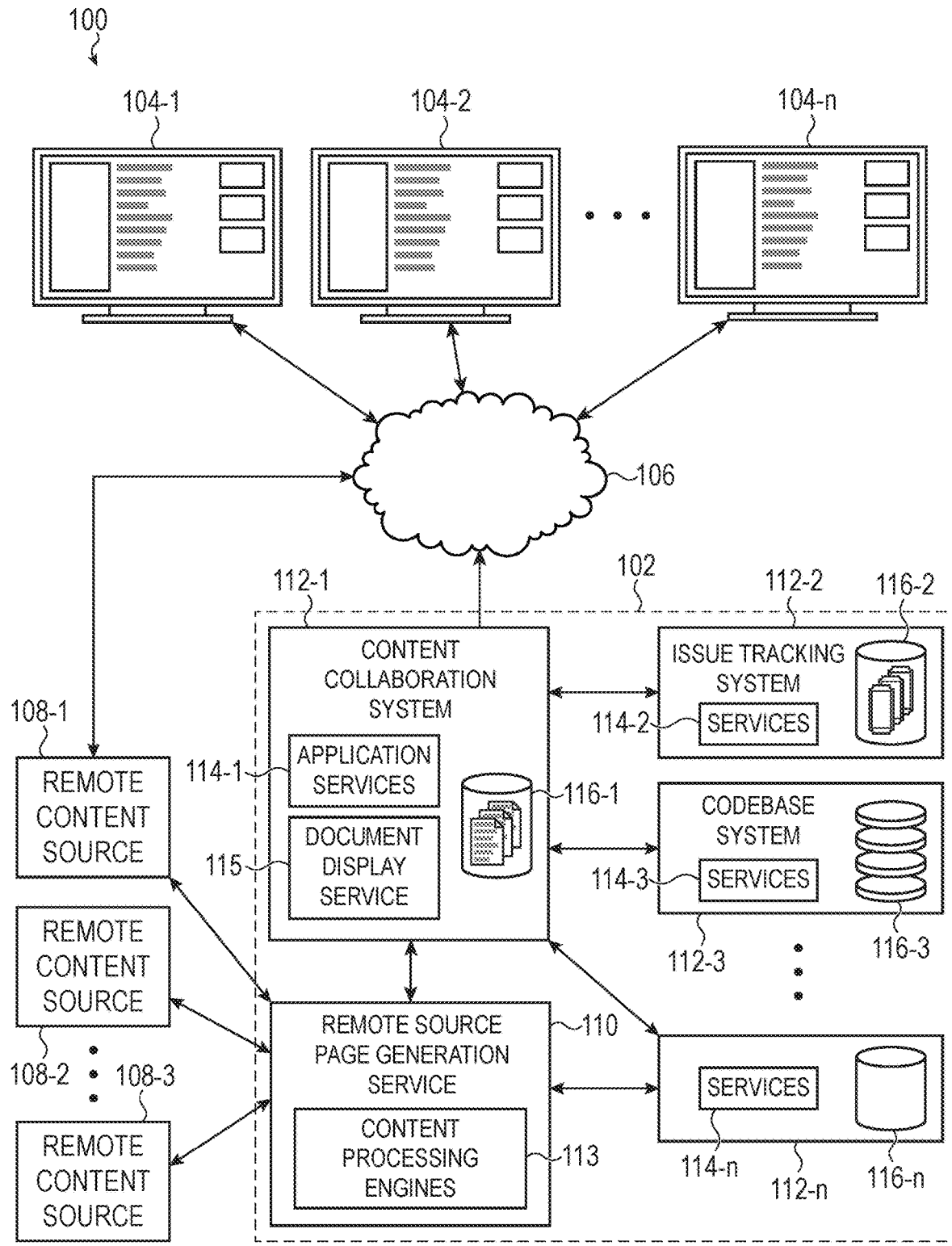
FIG. 1 depicts an example networked computer system in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description numerous specific details are set forth in order to provide a thorough understanding of the claims. It will be apparent, however, that the claims may be practiced without these specific details. In some instances, well-known structures and devices are shown in block diagram form in order to avoid unnecessary obscuring.

The systems and techniques described herein are directed to a content collaboration system that allows users to create and publish electronic content using a client application. In particular, the systems and techniques described herein may be applicable to content collaboration platforms that use a web browser client application to generate content creation and editing interfaces for creating electronic content, and also content viewing interfaces for viewing the electronic content. For example, a user may create a document, and then edit, view, share, or perform other operations on the document in the content collaboration system, and may publish the document for other users to do the same. The documents created within the content collaboration system are managed and/or stored by the content collaboration system, and may be formatted in a platform-specific structured data format that facilitates the creation, modification, and display of the documents.

The native user-generated documents or pages of a content collaboration system may be organized in accordance with a hierarchical organizational structure. A graphical user interface of the content collaboration system may include a navigational panel in which a hierarchical element tree is displayed. The hierarchical element tree reflects the hierarchical organizational structure and facilitates visualization of the hierarchical organizational structure of the documents. The hierarchical element tree may include a plurality of hierarchically arranged selectable elements. Each element may include a short summary, which may correspond to a document title or other metadata associated with the document, and may be selectable in order to cause content of the respective document to be displayed in an adjacent content panel. Each element of the hierarchical element tree or page tree may have a parent-child relationship to other elements of the tree, and the specific relationship or structure of the tree may be defined by a user.

While the content collaboration system facilitates the creation and presentation of documents that are managed by the content collaboration system, described herein are systems and techniques that allow users to create documents using content from external platforms (which may not otherwise be compatible with the content collaboration system) while also allowing users to manipulate, store, and view those documents within the content collaboration system. For example, a user can provide a link or address of a remote content item that is managed by an external platform. The content collaboration system may include content processing engines that are configured to process the content (which may not be compatible with the content collaboration system) and generate a document or other data object that includes the remote content (or includes programmatic elements that cause the remote content to be retrieved and processed for display by the content collaboration system).

The content collaboration system may allow the generated document or data object to be managed by a user in a manner similar to native documents (e.g., documents formatted in the platform-specific structured data format), such as allowing the generated document to be associated with a location in the hierarchical organizational structure of the documents, and to be moved within the hierarchical organizational structure. The content collaboration system may also allow users to modify certain aspects of the generated document (e.g., to add comments, change titles, etc.), while maintaining the remote content in the generated document. In some cases, modifications or changes made to the document in the content collaboration system may be pushed out to the external platform so that the remote content can be modified or updated accordingly.

To facilitate these operations, the content collaboration system may generate a document or other data object that includes references to the remote content and/or the external platform, but uses a platform-specific structured data format that allows the remote content (or a portion thereof) to be displayed and manipulated in the content collaboration system. These and other features of a content collaboration system are described herein. While certain example application environments are used to illustrate the features of the content collaboration system, these are provided for example purposes only.

FIG. 1 depicts an example networked computer system 100 (or simply "system 100") in which the techniques described herein may be employed. The system 100 includes an application platform 102, remote or third party content sources 108 (108-1, . . . , 108-n), associated software applications 112 (e.g., 112-1, . . . , 112-n), and client devices 104 (104-1, . . . , 104-n) that communicate via a network 106 (e.g., the Internet). The client devices 104 may be any suitable type of device, including but not limited to a desktop or laptop computer, tablet computer, mobile phone, personal digital assistant, smart device, voice-based digital assistant, or the like.

The application platform 102, also referred to herein as hosted services or host servers, may be or may include one or more servers, content stores (e.g., databases), communications systems, data structures, programs, or other components, systems, or subsystems that provide services described herein. The application platform 102 may also be referred to herein as hosted services, which may be provided by one or more host servers or other hardware elements of the system 100. The application platform 102 may include one or more software applications 112 (e.g., 112-1, . . . , 112-n), and a remote source page generation service 110. The one or more software applications 112 provide content and content services to users of the system 100, as described herein. For example, the content collaboration system 112-1 may allow users (e.g., via clients 104) to create, modify, view, and/or otherwise interact with system content, such as user-generated documents. The content collaboration system 112-1 may also allow users to create documents using content that is managed by external platforms. As described herein, in such cases, some portion or aspect of the remote content items remains managed by the external platforms, while a locally-managed document (formatted in accordance with a structured data format that is recognized by the content collaboration system 112-2) is managed by the content collaboration system 112-1.

The software applications 112 may include application services 114 (e.g., 114-1, . . . , 114-n) and data stores 116 (e.g., 116-1, . . . , 116-n). Application services 114 may facilitate the creation, deletion, management, editing, serving, and/or other services related to the content and/or content items (e.g., documents) associated with that software application and stored in the data store 116. Data stores 116 may be databases or other data storage resources that store documents, content items, and/or other data related to a software application 112.

As described herein, the first software application 112-1 may be a content collaboration system or platform. The content collaboration system may allow users (e.g., via clients 104) to create, modify, view, and/or otherwise interact with system content. User-generated content (e.g., content created by or designated by system users) is generally organized in what is referred to herein as a document space (or simply a space). Generally, a document space includes a set of documents (or other content items) having a hierarchical relationship to each other as designated by (or reflected by) a hierarchical document or element tree. Document spaces may include other content including a calendar, a space home page or overview, a space calendar, and other space-specific content. Document spaces may also include in-line comments, comment sections for each document or page, and other content that is adapted to receive and collect user feedback. Further, each document space designates at least one space administrator, which identifies a user account on the system having administrator authority and permissions. Specifically, a user account designated as a space administrator is granted the permission to set permissions for space-specific content including the set of documents (or pages), the set of blog entries, calendar entries, space overview, and other space content with respect to other system users. While there may be more than one space administrator, the authority to set permissions for a given space is generally not exceeded by another system user other than a tenant-level administrator or other special user account. In many cases, the space administrator is the creator or author of the document space.

The space content including electronic documents, electronic pages, blog posts, calendar entries and other content may be stored in the data store 116-1. User-generated content may include content such as text, images, graphics, tables, or the like. Documents may be linked or otherwise related to one another in a document hierarchy as designated by a hierarchical element tree (e.g., a document tree or a page tree). Documents (e.g., user-generated documents) may be stored in the data store 116-1 as discrete files, data structures, or other digital objects. The data store 116-1 may be a centralized or single physical data storage medium or, alternatively, may be distributed across physical memory managed by multiple devices.

The application services 114-1 of the content collaboration system 112-1 may facilitate content services related to the documents, including causing user interfaces of the content collaboration system 112-1 to be displayed to a user on a client 104, receiving user inputs relating to the creation and/or modification of documents, and the like. The application services 114-1 may also send to the remote source page generation service 110 information about page generation requests that are received, from a user, at the content collaboration system 112-1 and that reference content managed by external platforms. The application services 114-1 may receive information from the remote source page generation service 110, such as renderable content and/or documents that are formatted in accordance with a platform-specific structured data format and that include content or references to content from the external platform. As used herein, the term "renderable" or "renderable content" may be used to refer to content having a format that the content collaboration system 112-1 can process to cause the content to be displayed in a graphical user interface of a frontend application for the content collaboration system 112-1.

The content collaboration system 112-1 may include a document display service 115. The document display service 115 of the content collaboration system 112-1 may receive or access content items, including user-generated documents, blog posts, calendar entries, or other renderable content, and render the content items in a content panel of a graphical user interface of the content collaboration system 112-1. As described herein, the remote source page generation service 110 may produce renderable content that can be rendered (or otherwise processed for rendering) by the document display service 115. The document display service 115 may be configured to process content that is formatted in a platform-specific structured data format. For example, the document display service 115 may receive or retrieve a document or other content item that is formatted in the platform-specific structured data format, and generate, using the platform-specific structured data format, an output that can be rendered in the content panel of a GUI of the content collaboration system 112-1. The document display service 115 may ultimately provide the output to a browser or other application of a client 104 (via the application services 114-1 or other service of the content collaboration system 112-1) to cause the content of the document to be displayed to a user.

A second software application 112-2 may be an issue tracking system that tracks issues via issue tickets, which may be stored in the data store 116-2. Issue tickets may include content, such as a user-generated description of an issue, issue status (e.g., closed, open, awaiting review), user assignments, issue ticket urgency, issue ticket age, and the like. In some cases, issue tickets may include user-generated specifications of issues in computer code of software products.

Issue tickets (also referred to as "issues" or "tickets," separately) may be stored in the data store 116-2 as files, data structures, or the like. The application services 114-2 of the issue tracking system may facilitate content services related to the issue tickets, including causing user interfaces of the issue tracking system to be displayed to a user on a client 104, receiving user inputs relating to the creation and/or modification of issue tickets (e.g., changing status, receiving content related to the issue and/or issue resolution, etc.), changes to issue status, changes to user assignments, and the like.

A third software application 112-3 may be a codebase system that provides services related to creating, developing, maintaining, and/or deploying software code. The third software application may include, for example, a source code management system (SCM system), deployment management system, or other system configured to manage the storage, revision, and/or deployment of software products. Software code and other data associated with the third software application 112-3 may be stored in codebases 116-3. In some cases, code for distinct software programs, environments, platforms, or the like, may be stored in or as distinct codebases 116-3. Distinct codebases may be stored in different databases or data stores, or they may share one or more databases or data stores.

The application platform 102 may include one or more authorization services or authorization servers that are used to authenticate system users (accessing the system through client devices 104. Once authenticated, the users may be granted access to one or more of the respective software applications, platforms, and system content in accordance with a permissions scheme or profile stored with respect to each registered user account, which may be stored by or managed by a user profile database of the application platform 102. Each application may have a discrete or separate authorization service or system or applications may share or leverage a common authorization service or server. In one example, the application platform 102 provides a unified authentication service by verifying access from a permitted user and pairing the verified user with a corresponding user account in one or more of the software platforms. As one non-limiting example, the authorization service or server may use a shared cookie/scheme to authenticate each user account on each software application or platform. As another non-limiting example, the authorization service or server may authenticate users with a single sign-on service (SSO) and/or a two-factor authentication (2FA) service.

One or more remote (e.g., third party) content sources 108 may manage and/or store remote content items. Remote content sources 108 are or include external platforms that are separate from the application platform 102. For example, remote content sources 108 may include websites, other application platforms, remote data sources, SAAS entities, or the like. The remote content sources 108 may manage, store, or otherwise provide content items that are not in the platform-specific structured data format.

The remote source page generation service 110 may receive, from the content collaboration system 112-1, page generation requests that are received, from a user via a graphical user interface (GUI) of the content collaboration system 112-1. The page generation requests may be or may include a reference to an external platform, such as remote content sources 108. In some cases, the reference is or includes a uniform resource locator of the remote content source or of a content item managed by the remote content source. The remote source page generation service 110 includes content processing engines 113, which are configured to process content from remote content items associated with external platforms and generate renderable content that is formatted in accordance with the platform-specific structured data format. Multiple content processing engines 113 may be provided, with each engine configured to process particular types of content. In some cases, a processing engine may be configured to process content of a particular type, or content from a particular external platform. For example, one processing engine may be configured to process content of a particular file type (e.g., a spreadsheet, a database, a video file, etc.), while another processing engine may be configured to process content from a particular external platform (e.g., a media-hosting website, a codebase service, a particular data storage service, etc.).

Processing engines may be provided for various different external platforms and non-native content items (e.g., content items that are not formatted in the platform-specific structured data format or otherwise renderable by the content collaboration system 112-1). For example, a first processing engine may be configured to process content from a remote media hosting service, and a second processing engine may be configured to process content from a remote news or article hosting service.

Each processing engine may be configured to process the content to identify content elements of the remote content items. Content elements may include, without limitation, text, videos, images, advertisements, user comments, data fields, and the like. The processing engines may determine or select content elements to be included in a native document for presentation in the content collaboration system 112-1. For example, if a website (e.g., a remote content item) of a video hosting website (e.g., an external platform) has a video, a title, an advertisement, and a set of user comments, the processing engine for that particular external platform may be configured to identify the video, title, and set of user comments, and incorporate those content elements into a document or other renderable content of the content collaboration system 112-1 (while omitting the advertisement and/or other content elements that are not to be imported). Analyzing the content may include operations such as parsing, textual analysis, keyword searching, natural language processing, etc. In some cases, analyzing the content may include performing such operations on one or more data structures, files, websites, or the like. In the case of a website, analyzing the content may include accessing and analyzing an HTML file.

As noted above, the content of the external platform may not be in a format that is renderable by the content collaboration system 112-1. Accordingly, the processing engines may convert the processed content to renderable content that is formatted in accordance with the platform-specific structured data format. In some cases, the renderable content may include addresses (e.g., uniform resource locators (URLs)) of content elements (e.g., files, media sources, etc.) that were identified in the remote content item. Such addresses may be included in the platform-specific structured data format to allow such content elements to be rendered and generally managed by the content collaboration system 112-1 as native documents.

The processing engines may map certain types of content or content elements to particular positions or fields of a locally managed document. For example, if a page generation request includes an address of a website that includes video content, the processing engine may identify a title of the video and the video itself, and may generate renderable content (in the platform-specific structured data format) that results in the video being displayed in the center of the document, with the title centered over the video. The particular manner in which remote content is ultimately formatted and presented in the local document may be fixed by the processing engines (e.g., such that all content items of a certain type from a certain external platform are presented uniformly). As another example, the processing engines may be configured to determine a manner in which the content appears on the external platform, and format the renderable content to reflect the source appearance (e.g., fonts, content alignment, content size, position on a document or page, etc., may be partially or fully retained).

In some cases, the remote source page generation service 110 may also receive and process requests to create documents or other renderable content from content managed by other software applications 112 within the application platform 102. For example, a document creation request may request creation of a document (that is renderable in the content collaboration system 112-1) based on an issue in the issue tracking system 112-2. In response to receiving such a request, the remote source page generation service 110 may determine an appropriate content processing engine for the target content (e.g., an issue record), and the selected engine may process the target content to produce renderable content. Similarly, a document creation request may request creation of a document (that is renderable in the content collaboration system 112-1) based on a codebase in the codebase system 112-3. In response to receiving such a request, the remote source page generation service 110 may determine an appropriate content processing engine for the target content (e.g., a codebase), and the selected engine may process the target content to produce renderable content. For other applications 112 within the application platform, the content items may include content that is already in the platform-specific structured data format. In such cases, the renderable content may incorporated directly into a document for display in the GUI of the content collaboration system 112-1. In some cases, content from the content items of the other applications 112 are incorporated into a template or otherwise formatted differently when they are displayed in the GUI of the content collaboration system 112-1 as compared to when they are displayed in a GUI of their native application 112.

The remote source page generation service 110 may select a content processing engine from the set of content processing engines 113 based on information contained in a document creation request received from the content collaboration system 112-1. For example, the document creation request may include an address (e.g., a URL) of the remote content item. The remote source page generation service 110 may determine, based on the address (e.g., a domain or other information in the address), an identity of the external platform that manages the content item, and may select a content processing engine based on the external platform. For example, if the address indicates that the remote content item to be analyzed is associated with a video hosting web service, the remote source page generation service 110 may select an engine that is configured to process web pages that are hosted by that video hosting web service. As another example, if the address indicates that the content item is associated with a blog, the remote source page generation service 110 may select an engine that is configured to process web pages that are hosted by that blog.

In some cases, the remote source page generation service 110 may determine the external platform by other techniques. For example, the document creation request may include an identifier of the external platform separate from the address. The identifier may have been supplied by a user who initiated the document creation request (e.g., via direct entry, selecting from a list of candidate platforms, etc.).

Each engine may be uniquely configured to process content of a certain type in a certain way. Continuing the examples above, if the remote content item that is the subject of a document creation request is a website that includes streaming video content, the engine for analyzing that content/external platform may be configured to identify and retrieve a video source address from the website. If the remote content item is a blog, the engine for that content/external platform may be configured to identify and retrieve a blog post. If the remote content item is a news website, the engine for that content/external platform may be configured to identify and retrieve textual news content, associated images, a publication date, a news outlet identifier, and an author. In some cases, if a content processing engine is not available for a particular type of content item, the remote source page generation service 110 selects a generic content processing engine. The generic content processing engine may attempt to identify relevant content elements of the remote content item using content classification and/or identification techniques. For example, the generic content processing engine may analyze the content to identify media elements (e.g., video, images, audio), titles, headers, authors, or other salient information. If any such information is found in the content, the remote source page generation service 110 may incorporate any of those components into the renderable content for display by the content collaboration system 112-1.

In one example implementation, a content processing engine may analyze or process remote content items by parsing the content, analyzing the structure, formatting, and content types of the content to define a series of content nodes. The content nodes may correspond to blocks of text, formatted region, comments or user feedback content, images, embedded videos, or other content elements identifiable in the remote content item. The content processing engine may process each of the content nodes using a respective node processor or node conversion tool. For example, a text block node may be analyzed to extract the text content, font parameters, formatting, and other attributes of the extracted content and corresponding font parameters, and formatting attributes in the native or platform-specific format may be identified and used to construct a platform-specific node. Each node may use a different or respective node processor or conversion tool that is selected in accordance with the type of node that is being processed. The renderable content may be generated using the newly created nodes that have been generated using a compatible or native format with respect to the content collaboration system.

Once the remote source page generation service 110 processes content from an external platform (including producing renderable content formatted in the platform-specific structured data format), it may generate and store a document or other data object in the data store 116-1. The document may contain the renderable content formatted in the platform-specific structured data format, and a representation of the document (e.g., a title of the document) may be displayed as an element in the hierarchical element tree of the GUI of the content collaboration system 112-1. As described herein, a user may manipulate the element in the hierarchical element tree in order to change the position of the document in the hierarchy.

In some cases, instead of generating and storing a document formatted in the platform-specific structured data format in response to a document creation request, a data object that will initiate the processing of a remote content item may be generated. A selectable element that corresponds to the data object may be displayed in the hierarchical element tree and manipulated in the same manner as other elements in the hierarchical element tree. Upon selection of the selectable element, the remote source page generation service 110 may perform the operations described herein to process a remote content item and produce renderable content formatted in the platform-specific structured data format. Thus, selection of the selectable element may initiate or cause a document generation request (which may be issued to the remote source page generation service 110 to initiate the operations of producing renderable content from or using the remote content item).

In some cases, a hybrid technique is used, in which the remote source page generation service 110 generates (and causes to be stored) a document that includes renderable content in the platform-specific structured data format, as well as instructions that will cause the remote source page generation service 110 to produce renderable content upon receiving a selection to display the document. Thus, upon receiving a selection of a selectable element that corresponds to such a document, the content collaboration system 112-1 may cause the previously-generated renderable content to be displayed in a GUI, and may cause the remote source page generation service 110 to produce additional renderable content (e.g., in real time) using the processing operations described herein, which may then be displayed in conjunction with the previously-generated renderable content.

Figure 2A:
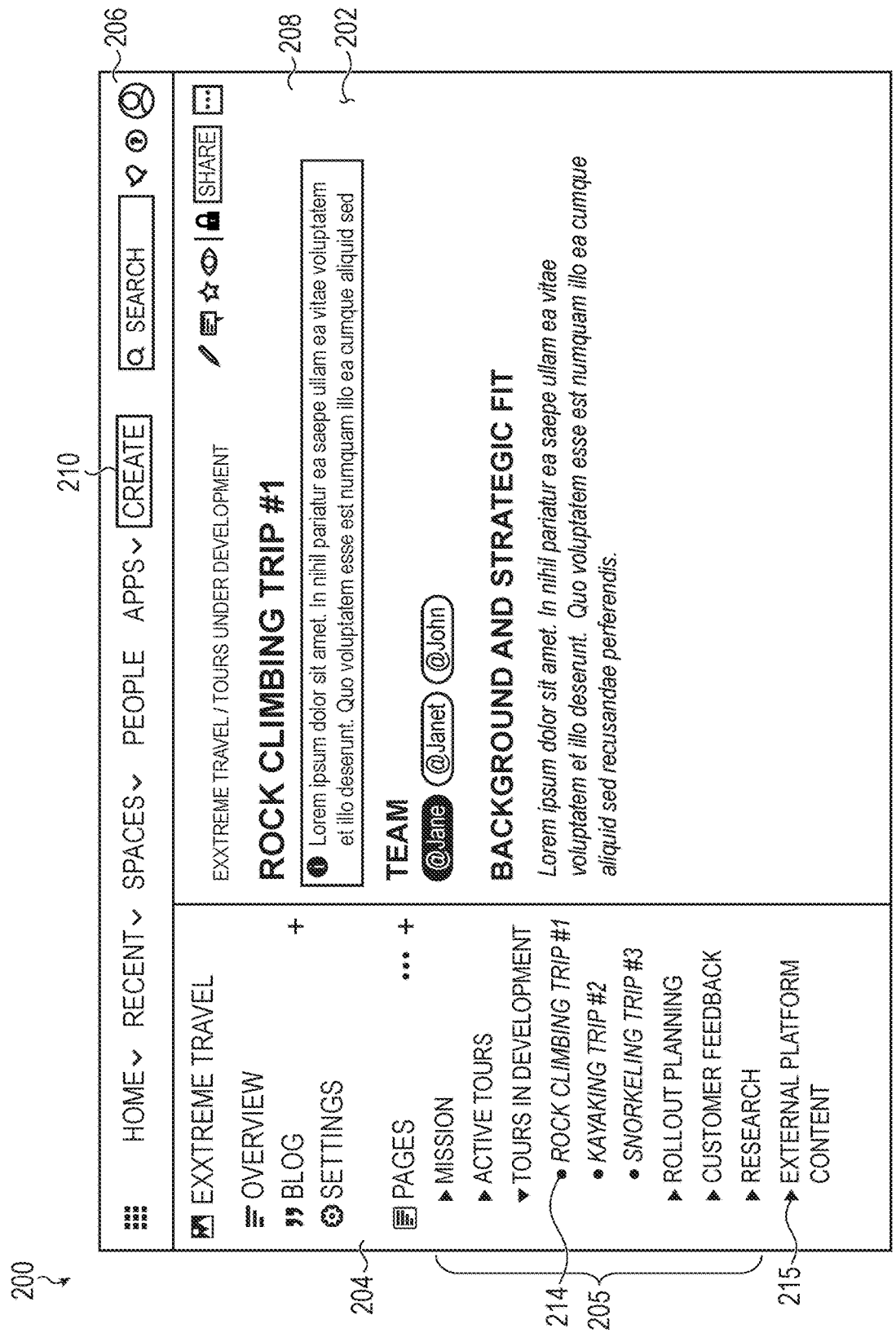
FIG. 2A depicts an example graphical user interface of a software application.
Figure 2B:
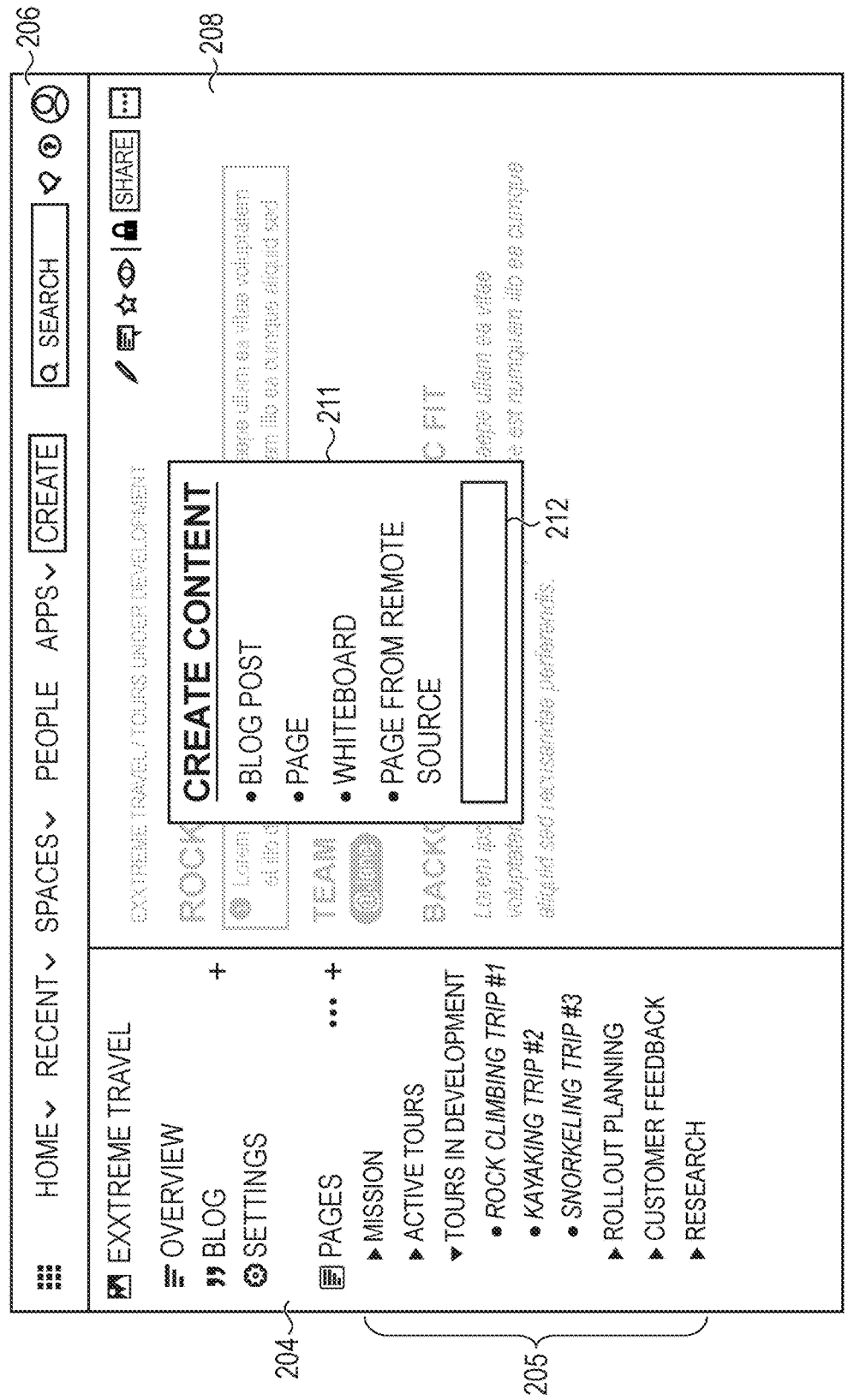
FIGS. 2B-2C depict document creation request operations in an example graphical user interface of a software application.
Figure 2C:
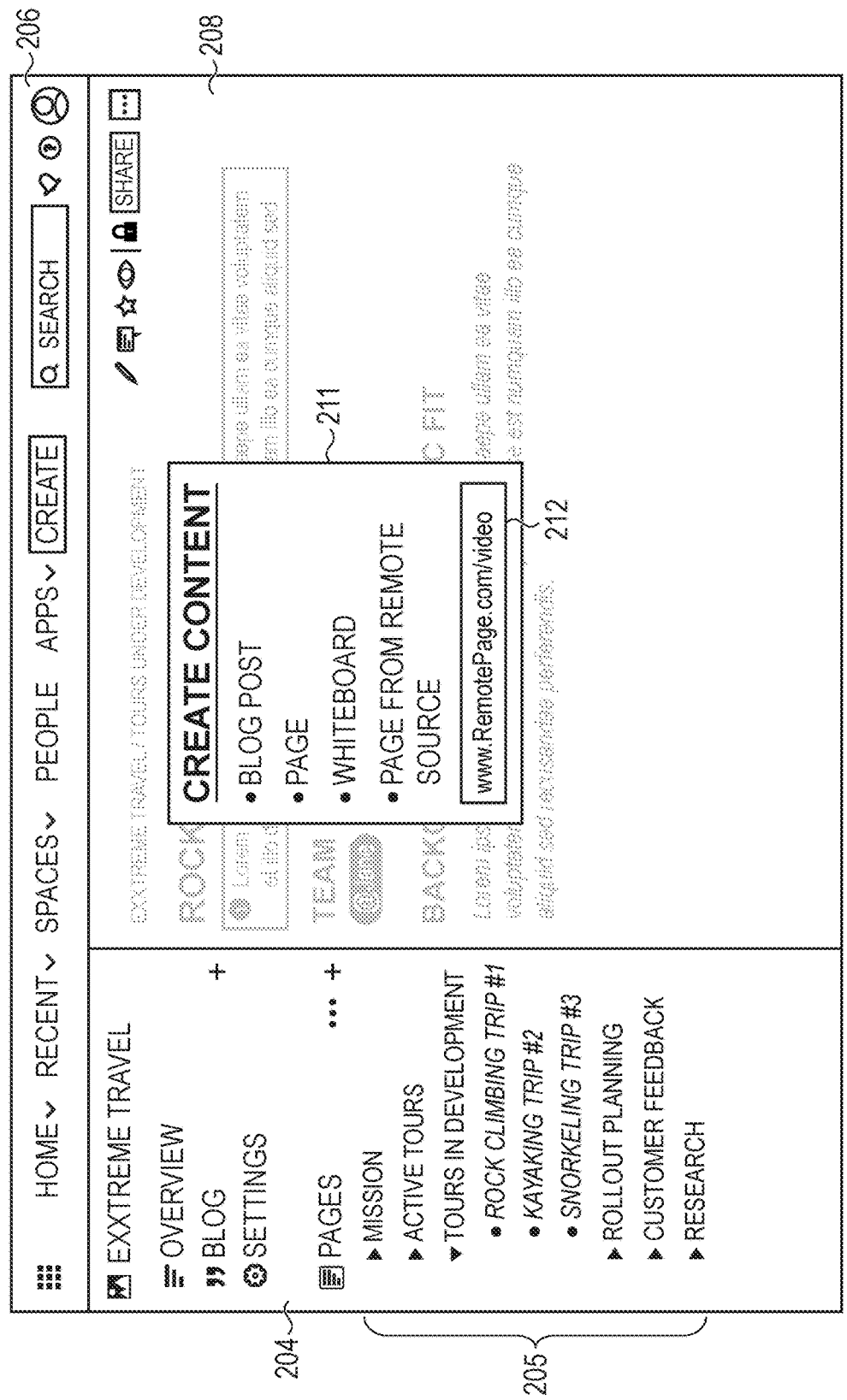

FIGS. 2A-2C depict example views of a graphical user interface or a frontend application executing on a client device of a user. The graphical user interface (GUI) 200 provided by the frontend or client application may operate in one of a number of different modes. In a first mode, a user may create, edit or modify an electronic document, page, or electronic content. This mode or state of the graphical user interface may be referred to as an editor user interface, content-edit user interface, a page-edit user interface, or document-edit user interface. In a second or other mode, the user may view, search, comment on, or share the electronic document, page, or electronic content. This mode or state of the graphical user interface may be referred to as an viewer user interface, content-view user interface, a page-view user interface, or document-view user interface. The graphical user interface may be implemented in a web browser client application using HTML, JavaScript, or other web-enabled protocol.

The graphical user interface may allow the user to create, edit, or otherwise modify user-generated content that is stored as an electronic document or page (e.g., in the data store 116-1 of the content collaboration system 112-1). The examples in FIGS. 2A-2C depict a graphical user interface in a viewer mode. For example, a graphical user interface 200 shown in FIG. 2A is a rendering of an electronic document, page, or electronic content in a graphical user interface 200. The electronic document, page, or electronic content may be rendered on a client device by the content collaboration system 112-1. In one example, the graphical user interface 200 may have various partitions/sections displaying different content. For example, the graphical user interface 200 may include a navigational panel 204, a toolbar 206, and a content panel 208.

The content panel 208 may display the contents of a selected document or other content item, and may allow a user to edit the selected document or content item (e.g., to add, change, or remove content). In general, when an authenticated user has edit permissions with respect to the displayed content and the graphical user interface is in an edit mode (rather than a view mode), the content panel 208 may operate as a content editor and allow the user to directly add, edit, modify, or otherwise interact with the content of the document or content item. When a user does not have edit permissions, or when the content panel 208 is otherwise in a view mode, rather than an edit mode, the document or content item may be displayed in a view-only mode, or with only limited ability to add, edit, or otherwise modify the content.

The navigational panel 204 may include a hierarchical element tree 205 (also referred to herein as a page tree), which may be associated with a particular document space or content space. The hierarchical element tree 205 includes tree elements, which may be selectable to cause display of a corresponding page or document. Tree elements may also be referred to herein as selectable elements. Each tree element shown in the navigational panel 204 may be displayed according to its respective hierarchical relationship to the current electronic document, page, or electronic content being displayed. Further, each tree element for the hierarchical element tree 205 may be selectable. In response to a user selection of a respective element of the hierarchical element tree 205, content of the respective page or document may be displayed in the content panel 208. As described above, a selectable element in the hierarchical element tree 205 may correspond to a user-generated document (e.g., element 214), a document that is generated by the remote source page generation service 110 (and includes renderable content produced by a content processing engine), or a data structure that will cause the remote source page generation service 110 to produce renderable content from a content item of an external platform. Tree element 215, for example, corresponds to external platform content (e.g., a document or data structure that will cause display of renderable content that originated at an external platform). In some cases, the selectable elements themselves do not indicate which type of document or data structure it corresponds to, while in other cases, the selectable elements include a graphical, textual, or other indicator to indicate the type and/or source of a document (e.g., an icon may indicate whether the document is a native document, or generated from an external platform). As described above, selectable elements in the hierarchical element tree may be manipulatable in the hierarchical element tree in the same manner, regardless of the source of the document. Thus, a selectable element that corresponds to a document produced by the remote source page generation service 110 may be manipulatable within the tree in the same manner as a native document.

The navigational panel 204 also includes items that may be selected in order to cause display of other user-generated content that is outside of the hierarchical element tree 205. Specifically, the navigational panel 204 includes an overview element that is selectable to cause display of space-overview content in the content panel 208, a blog element that is selectable to cause display of one or more respective blog entries in the content panel 208, and a settings element that can be used to access setting associated with the current page being viewed and/or the document space. In some cases, display of the navigational panel 204 may suppressed or hidden using a control provided in the graphical user interface 200. Additionally or alternatively, the navigational panel 204 may be resized or slid all the way to the side of the graphical user interface in order to hide or suppress display of the navigational panel 204.

The page toolbar 206 may provide, to a user, various control options, including but not limited to, set or configure various restrictions for the electronic document, page, or electronic content that the user is creating/editing, to view or review recently accessed electronic documents. The page toolbar 206 may also include a search or query space for the user to enter one or more keywords to perform search for electronic documents, pages, or electronic content that may be related to the one or more keywords entered by the user. The page toolbar 206 may also include options for selecting a different document space, view recently viewed documents or pages, view people associated with the system or respective content, navigate or launch other applications, or view other aspects of the system. The page toolbar 206 may include a content create element 210 for initiating the creation of content items in the content collaboration system 112-1.

FIG. 2B illustrates the graphical user interface 200 after a user selection (e.g., a mouse click) of the content create element 210. For example, in response to detecting the selection of the element 210, a content create menu 211 is displayed. The content create menu 211 may include a list of content item types that may be created (e.g., Blog Post, Page, Whiteboard, and Page From Remote Source). Upon receiving a selection of a content item type, the content collaboration system 112-1 may initiate a content creation operation for that content type. While the content create menu 211 lists some example options, these are merely for example purposes, and are not limiting. Other types of content item types may be included, such as computer code files, issues (e.g., of an issue tracking system), emails, messages, etc.

The "Page From Remote Source" option is configured such that, upon selection of the element and provision of a link, address, or other identifier of a remote content item, the content collaboration system 112-1 initiates one or more operations for generating renderable content (and optionally a document or other data structure) from a remote content item managed by an external platform, as described herein. In some cases, a selection of the "Page From Remote Source" option and the provision of an address to a remote content item corresponds to (or otherwise causes the content collaboration system 112-1 to receive) a document creation request. Thus, the document creation request received or detected by the content collaboration system 112-1 includes an address to a remote content item.

The "Page From Remote Source" option may include or be displayed in conjunction with an input field 212. The input field 212 may be configured to receive an address or other identifier of the remote content item. The address may be input manually, by pasting the text of the address into the field 212, by dragging a browser window or tab directly into the field 212 (or anywhere in the content create menu 211), or by any other suitable technique. Upon receipt of the selection and/or provision of the address, the content collaboration system 112-1 may proceed with the operations to generate renderable content from the external platform.

FIG. 2C illustrates the content create menu 211 with an address having been input into the field 212. The address may be a URL or other identifier of a content item that is managed by an external platform and that does not include content in the platform-specific structured data format of the content collaboration system 112-1. In this example, the URL ("www.remotepage.com/video") is an address of a web page that is managed by an external platform (e.g., other than the content collaboration system 112-1), and that includes video content. In other examples, other types of pages, content items, data sources, etc., may be referenced by the address.

Figure 2D:
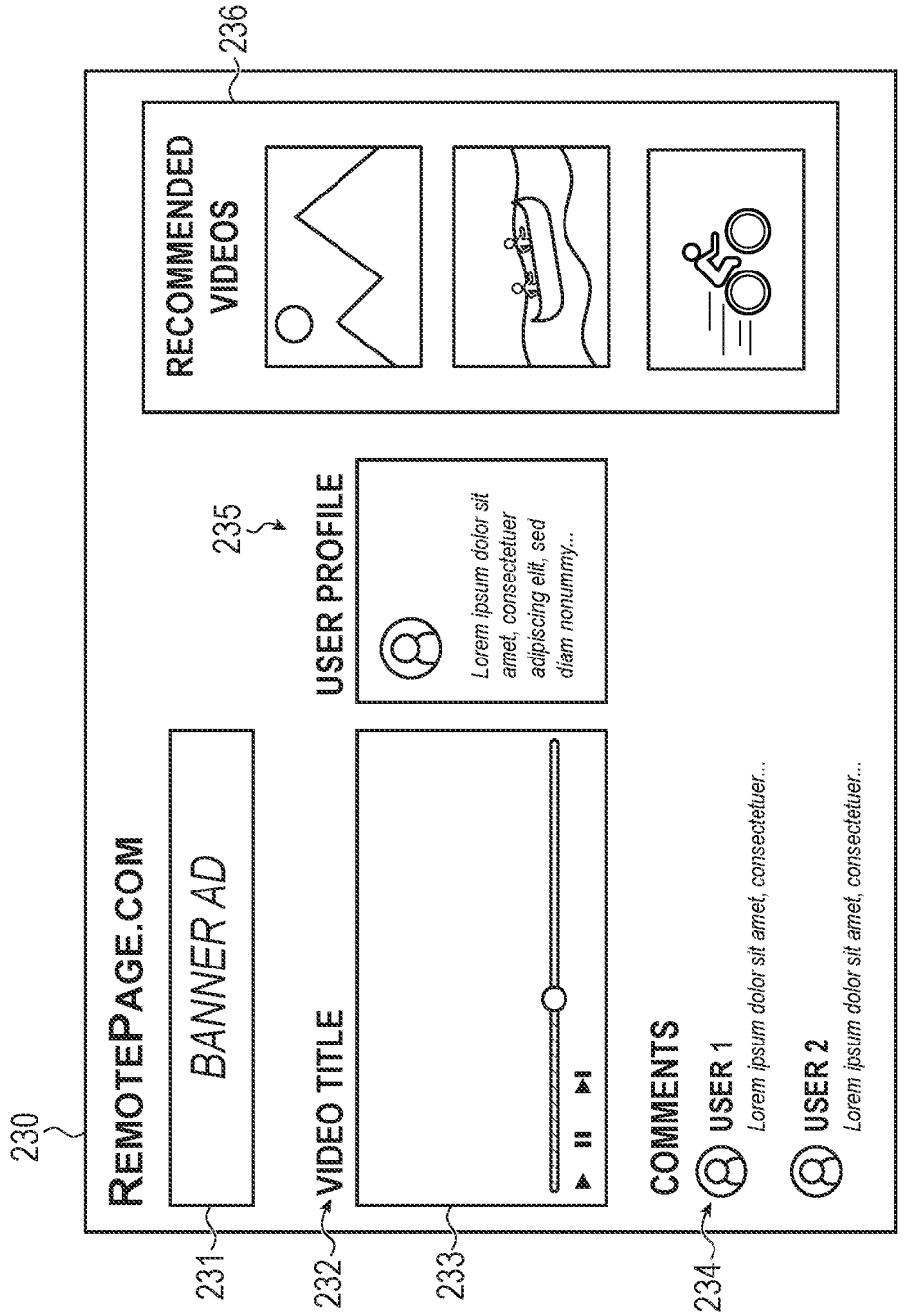
FIG. 2D depicts an example remote content item.

FIG. 2D illustrates an example representation of the content item referenced by the URL. For example, the content item may be a webpage 230. The webpage 230 may various content elements and may have a particular format, arrangement, appearance, and/or other attributes. Moreover, the webpage 230 may be defined by data structures (e.g., files, code, etc.) not formatted in the platform-specific structured data format. Thus, the GUI 200 may not be configured to display the webpage 230 in the content panel. In the example shown in FIG. 2D, the example content of the webpage 230 includes a banner advertisement 231, a content element 233 (e.g., a video), a content title 232 (e.g., a title of the video), a comment list 234, a user profile summary 235 (e.g., of the author/poster of the video), and a recommendation pane 236 (e.g., recommending other videos to the viewer). The example webpage and webpage content shown in FIG. 2D is an example of a video hosting website, but many other types of content items and content are also contemplated, such as news sources, blogs, wikis, issues (e.g., of an issue tracking system), codebases, media hosting sources (e.g., audio, video, image, etc.), and the like.

As described herein, the remote source page generation service 110 may be configured to retrieve and analyze content from the remote content item (e.g., the webpage 230), and create renderable content therefrom. In some cases, the remote source page generation service 110 is configured to produce renderable content for the GUI 200 for only a subset of the content that exists in the remote content item. For example, in the case of a video hosting webpage, the remote source page generation service 110 may include, in the renderable document, the video content element 233, the content title 232, and the comment list 234, while excluding other content (e.g., the banner advertisement 231, user profile summary 235, and recommendation pane 236). As described herein, the remote source page generation service 110 and the content processing engines 113 may be configured to identify and produce renderable content from certain types of content elements of a remote content item, while ignoring other types of content. The types of content that are identified and processed may be predetermined for a particular external platform or for a type of external platform. Thus, for example, in the case of the video hosting webpage, the remote source page generation service 110 and the processing engine 113 that is selected for the webpage 230 may be configured to identify a content element, a title, and any user-generated comments, and produce renderable content only for those items (should they exist). The processing engines 113 may use various techniques for identifying the target content, including text searching the content and/or underlying content code (e.g., HTML code) for salient words or comments, performing image or video analysis, searching underlying content code for headers or comments, or the like.

Figure 2E:
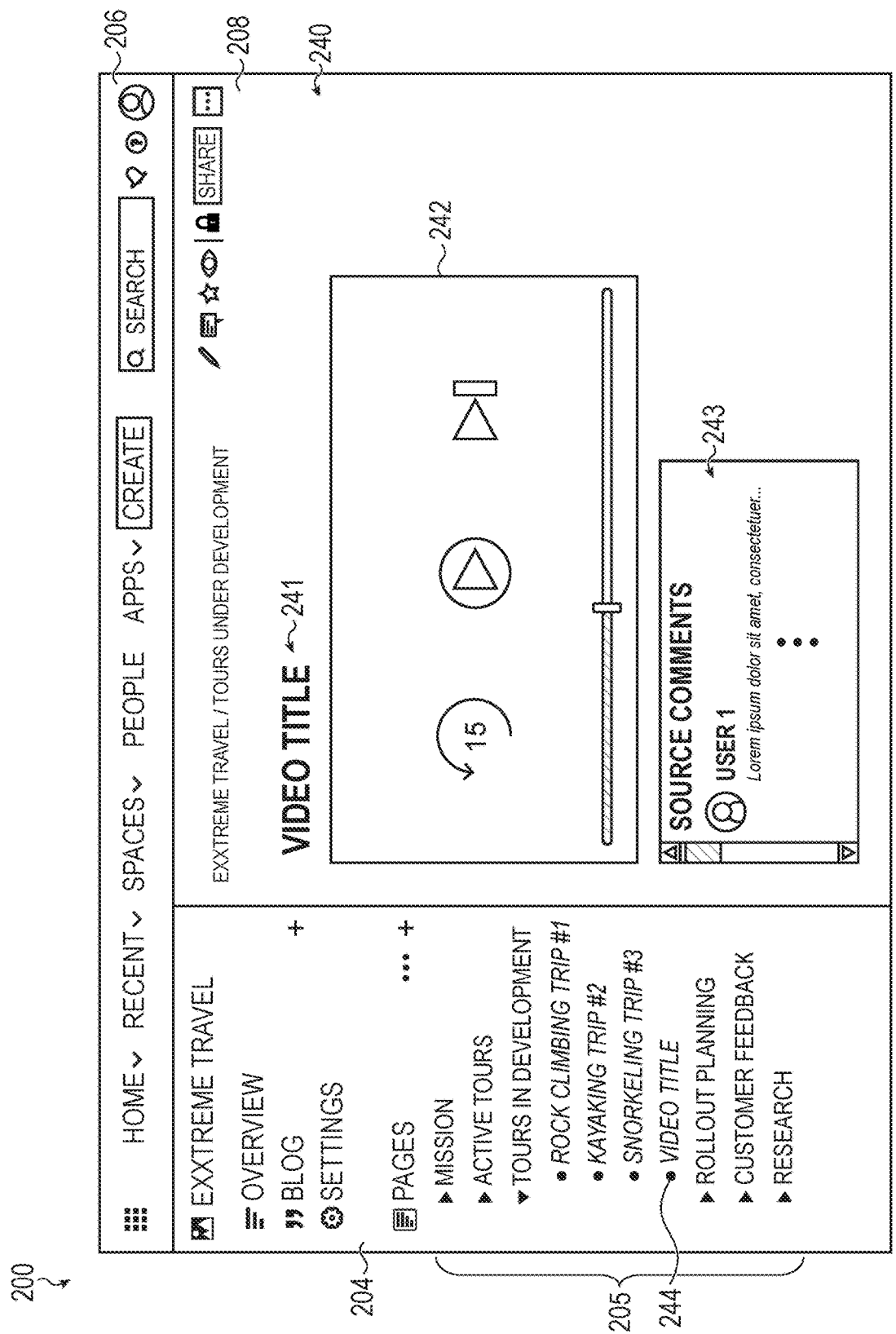
FIGS. 2E-2F depict renderable content generated from a remote content item being displayed in an example graphical user interface of a software application.

After processing the content from the remote content item using the selected processing engine and producing renderable content formatted in accordance with the platform-specific structured data format, the content collaboration system 112-1 may cause the renderable content to be displayed in the content panel. FIG. 2E illustrates the GUI 200 while the renderable content generated by the content processing engine is displayed in the content panel 208. The renderable content may appear as a document 240 in the content panel 208, and may include a document title 241, a content element 242 (e.g., a video), and user comments 243. These are merely examples of the content that may be incorporated from an external platform into a renderable document. In some cases, portions of the example content maybe omitted (e.g., the title, the comments), and others may be included (e.g., name of external platform, advertisements, additional media, etc.).

It will be understood that the document 240 shown in the figures corresponds to the rendered or displayed content of an underlying data object. The data object may be a data structure that is formatted in the platform-specific structured data format, that includes content formatted in the platform-specific data structure, and/or includes instructions and/or programmatic elements (and any other associated data) that causes renderable content formatted in the platform-specific structured data format to be produced.

In some cases, certain content of the remote content item may be converted to or otherwise processed to produce renderable content (in the platform-specific structured data format) that is stored by the content collaboration system 112-1 and managed in a manner similar to other documents in the content collaboration system 112-1. Thus, for example, the content processing engines may extract a title from the remote content item, and assign the title from the remote content item as the document title 241 of the data object (e.g., the document title 241 may be the same as the title in the remote content item). The generated document title 241 may be stored in conjunction with the data object, and thus may be manipulated by users in the same manner as other document titles. For example, while the default title for a generated data object may be the same as the title in the remote content item, a user of the content collaboration system 112-1 may modify, update, delete, or otherwise change the title that appears when the document 240 is displayed.

As described above, the processing engines may be configured to preserve at least some formatting of the original remote content item. For example, the placement, size, and/or position of content elements, fonts, text sizes, alignment, overall page arrangements, colors, background images, and the like, may be represented in the document 240 in the same or similar manner as the remote content item. In some cases, only a portion of the formatting of a remote content item is preserved in the document 240. In some cases, the appearance of the document 240 (e.g., the renderable content produced from the remote content item, shown in FIG. 2E) has a different appearance than the remote content item itself (e.g., the remote content item 230 in FIG. 2D).

In response to receiving a document creation request (and optionally in response to the processing of a remote content item to produce renderable content), a selectable element 244 corresponding to the renderable content (e.g., the data object or document that includes the renderable content) may be displayed in the hierarchical element tree 205 in the navigational panel 204. The selectable element 244 may have a hierarchical relationship to other selectable elements in the hierarchical element tree, as described herein, and may reflect or define the hierarchical relationship between the generated data object and other documents managed by the content collaboration system 112-1. The selectable element 244 may include an indication that it was generated from or otherwise reflects the content of a remote content item, or it may be indistinguishable from local or native documents. In the former case, the selectable element 244 may be presented in a different font, size, or color, or displayed with a graphical object indicating the source, or otherwise visually distinguished from native documents.

The selectable element for a generated data object may have a same title as the title of the data object (which may be extracted from the remote content item itself). In some cases, the title of the selectable element may be linked to the title of the generated data object, such that if a user of the content collaboration system 112-1 changes either title, the other title will be updated to reflect the change. In some cases, one or both of the titles are not modifiable by a user of the content collaboration system 112-1, and are instead fixed to be whatever was (or is currently) contained in the remote content item.

In some cases, when a selectable element is created in response to a document creation request, the selectable element for that document is displayed in the same hierarchical position as a local document that was being displayed when the document creation request was received. For example, a document 202 corresponding to the element 214 labeled "Rock Climbing Trip #1" is displayed in the content panel 208 (FIG. 2A) when the document creation request is received (FIG. 2C). The element 214 and underlying document is associated with a particular position in the hierarchical element tree (e.g., under a "Tours In Development" position). Accordingly, the selectable element 244 that corresponds to renderable content produced from the remote content item (e.g., the document 240) is associated with the same position in the hierarchical element tree (e.g., under the "Tours in Development" position), as shown in FIG. 2E.

Selectable elements in the hierarchical element tree 205 may be manipulated by a user to change the hierarchical relationship of the selectable elements (and the underlying documents). For example, a user may drag (e.g., via a mouse input or other input) selectable elements to new locations within the hierarchical element tree 205. Upon moving a selectable element, the selectable element will be shown in a new position, and the underlying document or other content may also be associated with the new hierarchical position. For example, dragging and dropping a selectable element to a different location in the hierarchical element tree 205 causes a reassignment or modification of the hierarchical (e.g., parent, child, sibling) relationship between the corresponding document and other documents that are represented by selectable elements in the hierarchical element tree 205.

Figure 2F:
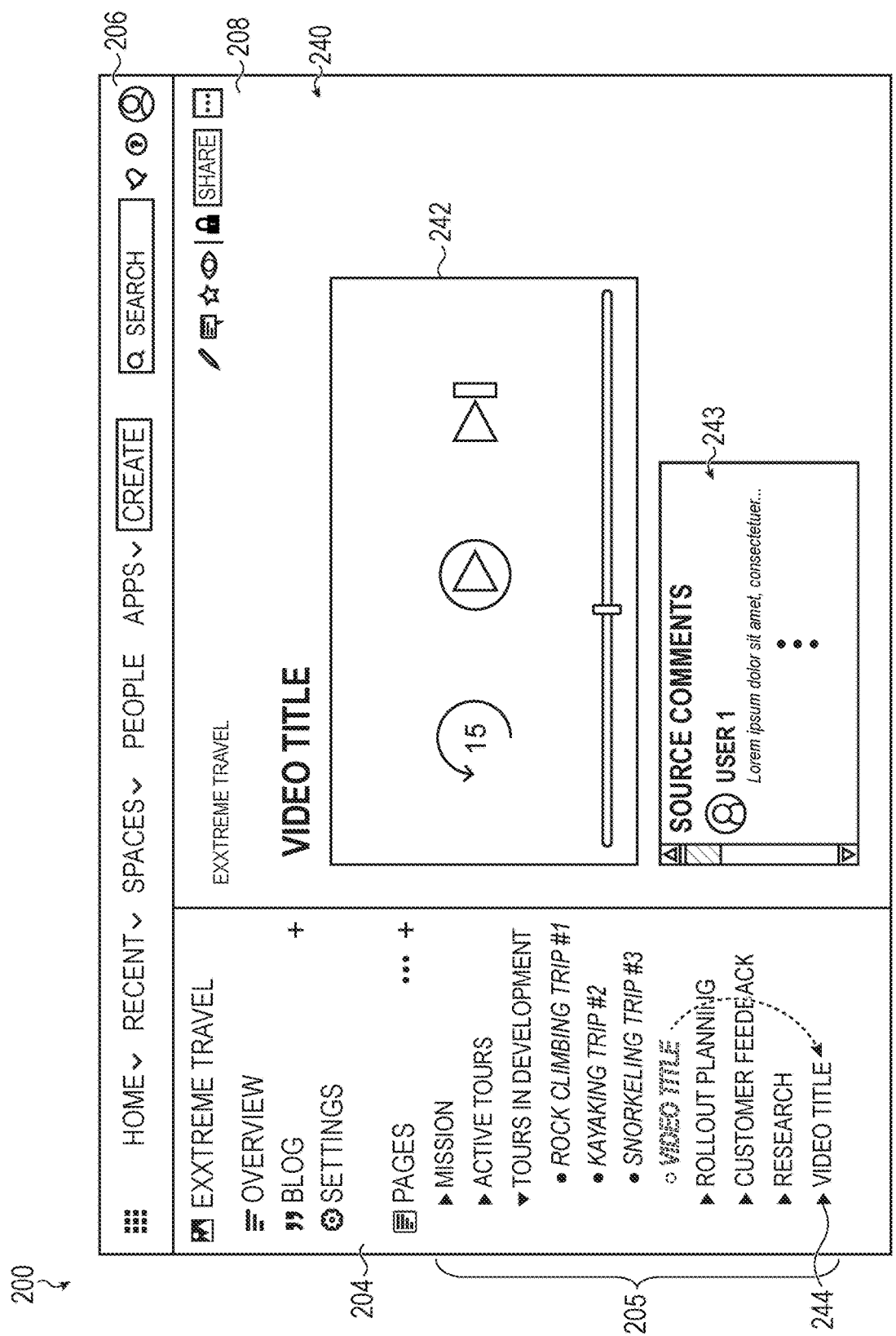

This functionality may apply to both documents that are managed by the content collaboration system 112-1, and data objects that are generated from remote content items at external platforms. Thus, while the generated content items may not be created in the same way as native documents (e.g., they are populated with content from an external platform, rather than user-generated content from users of the content collaboration system 112-1), the generated content may be manipulated in the hierarchical element tree in the same manner as native documents. FIG. 2F illustrates an example GUI 200 after a user has moved the selectable element 244 from its initial position, shown in FIG. 2E) to a new position in the hierarchical element tree 205 (e.g., below "Research" in the example hierarchical element tree 205). This operation may be initiated by a drag-and-drop input or any other suitable input.

As noted above, a document may be placed in the hierarchical element tree in the same level of the hierarchy as a document that is displayed when the document creation request is received. In some cases, if no document is displayed in the content panel when the document creation request is received, the selectable element and underlying data object may be associated with a default position or level in the hierarchical element tree. The default position may be a first element in the first level of the hierarchy, a last element in the first level of the hierarchy, or any other suitable position. For example, FIG. 2F illustrates the appearance of the GUI 200 in response to a document creation request being received when no document was being displayed in the content panel 208. Accordingly, the selectable element 244 that corresponds to the renderable content produced from the remote content item (e.g., the document 240) is associated with the last element of the first level in the hierarchy (e.g., below "Research" in the example shown).

As noted above, a document creation request may result in the generation of a document (e.g., a data structure formatted in the platform-specific structured data format that is stored and/or managed by the content collaboration system 112-1), or a data object that that will, when executed or otherwise processed, initiate the processing of a remote content item to produce renderable content (e.g., via the remote source page generation service). The selectable element 244 represents either type of output. Thus, for example, the selectable element 244 need not relate to or be associated with a pre-generated data object that is formatted in the platform-specific structured data format, but may instead relate to or be associated with an instruction or other programmatic element that will cause renderable content (and optionally a document that is managed by the content collaboration system 112-1) to be generated when the corresponding selectable element is selected.

As noted above, the content collaboration system 112-1 facilitates the creation and modification of user-generated documents. For example, users can generally modify the content of a document that is managed by the content collaboration system 112-1 (if they have suitable permissions for modifying that document). Example modifications include adding or removing content elements (e.g., text, video, audio, images, computer code), modifying titles, adding comments, and the like. While documents that are generated from remote content items on external platforms may not be initially created in the same manner as other user-generated documents (e.g., they are generated by the remote source page generation service rather than by a user entering content), it may still be advantageous to allow users to provide user-generated content that is included in and/or displayed with the generated data object. Such user-generated content may be strictly local to the content collaboration system 112-1, while some user-generated content may be sent to the external platform and may be reflected in the remote content item. In order for user-generated content to be accepted by the external platform, the external platform may provide one or more application programming interfaces (APIs) that can be accessed by the content collaboration system 112-1 to propose the modifications to the external platform.

Figure 2G:
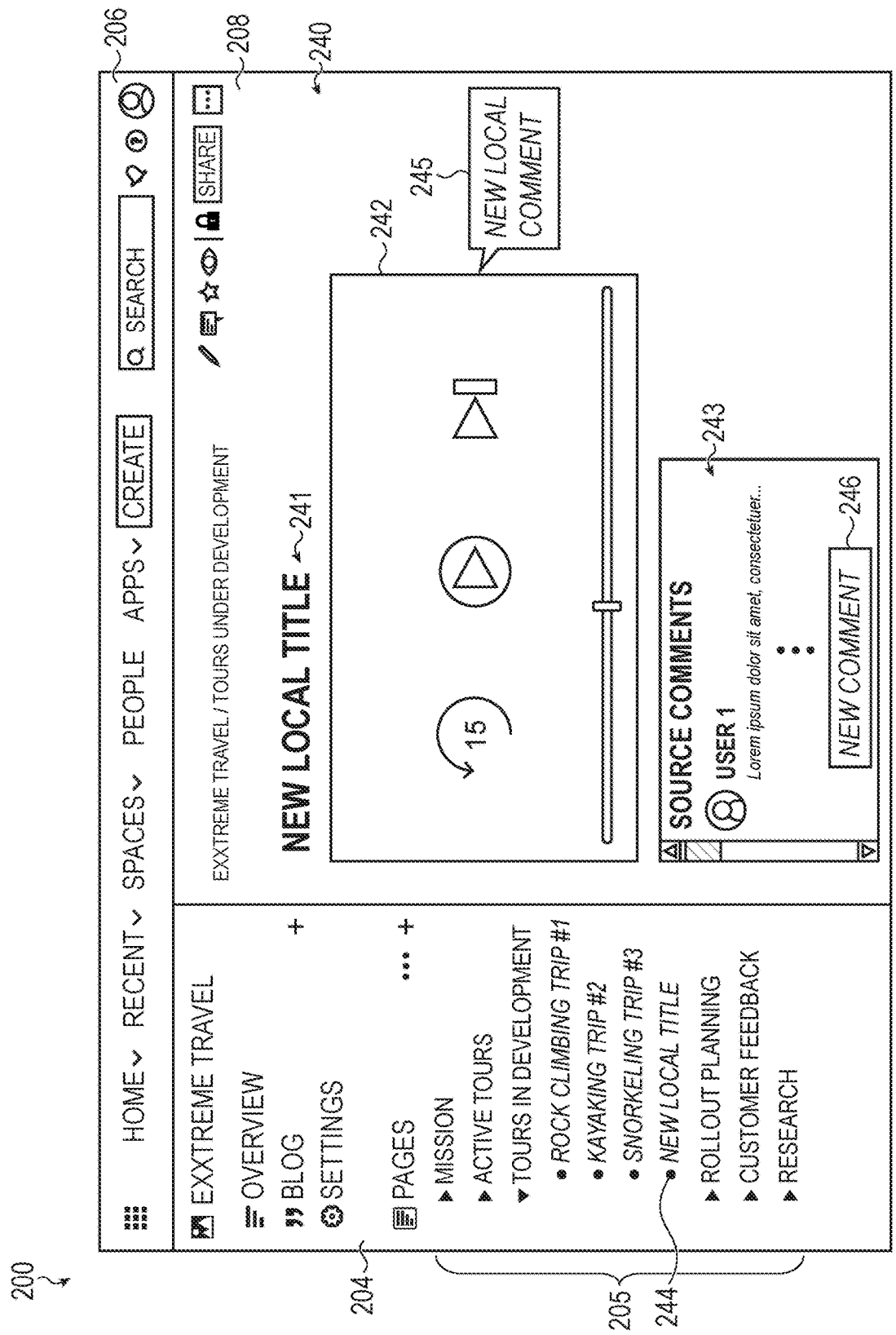
FIG. 2G depicts user-generated content incorporated into renderable content generated from a remote content item.

FIG. 2G illustrates the GUI 200 showing examples of the displayed document 240 having both local edits (e.g., user-generated content that is local to the content collaboration system 112-1 and are not reflected in the remote content item at the external platform), and bi-directional edits (e.g., user-generated content that is sent to the external platform for inclusion in the remote content item). For example, the GUI 200 in FIG. 2G shows the document title 241 having been updated to a new local title. The new local title may be reflected in both the document display in the content panel 208, as well as in the selectable element 244 in the hierarchical element tree 205. The new local title may replace the title that was assigned to the document or data object during the initial processing of the remote content item. The local title may be associated with the generated data object by the content collaboration system 112-1, but may not be provided to the external platform. For example, the remote content item may be a webpage hosted by a service that is separate from the application platform 102, and as such it may not be desirable to allow users of the application platform 102 to change the title of the webpage.

FIG. 2G also illustrates the document 240 with a local comment 245 (e.g., a user-generated comment) included in the content panel 208. The local comment 245 may be generated by a user of the content collaboration system 112-1 while working in a client of the content collaboration system 112-1, and may be stored in conjunction with the document 240. For example, it may be incorporated, as renderable content formatted in the platform-specific structured data format, in the data structure that defines the document 240. Thus, when the document 240 is viewed in the content collaboration system 112-1 (e.g., in the content panel 208) by a user of the content collaboration system, the local comment 245 (and/or other local comments) may be displayed. The local comment 245 may not be supplied to the external platform, but may only exist as content within the content collaboration system 112-1.

FIG. 2G also illustrates examples of user-generated content that may be created with in the GUI of the content collaboration system 112-1, but which may be provided to the external platform to be included (or proposed for inclusion) in the remote content item. For example, a new comment 246 may be included in the comment section of a media item. This comment may be provided to the external platform (e.g., via an API call), and may be included in the comment list in the remote content item.

In some cases, all user-generated content that is produced for a document generated from a remote content item may be provided to the external platform (e.g., via API calls). The external platform may determine what, if any, of the user-generated content to include in the remote content item.

User-generated content that received for a particular generated data object may be stored in association with the renderable content that was produced from the remote content item. Thus, for example, when a document (or other data object) is generated with respect to a remote content item, user-generated content may be stored in the document or data object in association with the renderable content that was produced (or in association with instructions or other programmatic elements that are configured to cause renderable content to be produced using the remote content item).

In some cases, certain content elements in a document that is generated from a remote content item may be updated to reflect any changes to the remote content item. For example, each time a document generated from a remote content item is selected for display, the content collaboration system 112-1 and/or the remote source page generation service 110 may access the remote content item to determine if any of the content elements that were incorporated into the document in the content collaboration system 112-1 have been changed, and if so, the remote source page generation service 110 may generate new renderable content to reflect the changed content elements in the remote content item. Thus, for example, if new comments have been added to the remote content item since the initial document creation request, the new comments may be reflected in later viewings of the document. In some cases, only a subset of available content elements are updated (e.g., comments), while others are not (e.g., titles, media items).

Figure 3:
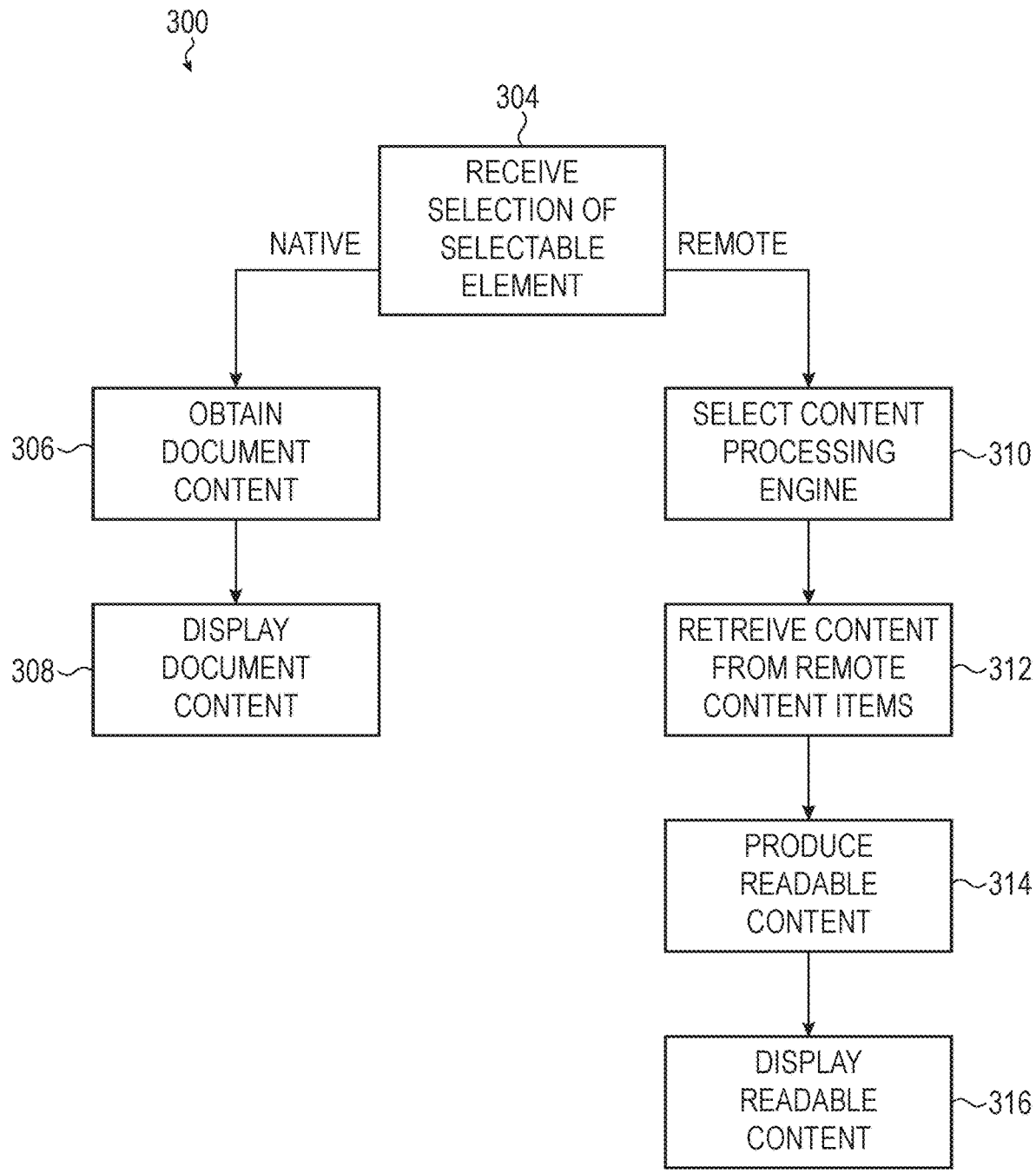
FIG. 3 depicts an example process for displaying documents in a software application.

FIG. 3 illustrates a process 300 by which the content collaboration system 112-1 may facilitate the generation of renderable content within the content collaboration system from remote content items, while providing a seamless integration of the remote content in the user interface experience of the content collaboration system. The process 300 may be performed while the content collaboration system is causing a client computer to display a graphical user interface that includes a content panel (e.g., the content panel 208) that configured to display content of a selected content item, and a navigational panel (e.g., the navigational panel 204) that includes including a hierarchical element tree (e.g., the hierarchical element tree 205). At operation 304, a selection of a selectable element is received. For example, a user may click on or otherwise select an element from the hierarchical element tree 205. As described herein, the content collaboration system 112-1 may perform different operations depending on whether the selected element refers to a native user-generated document (e.g., a document managed by the content collaboration system 112), or a remote content item.

For example, in response to the selected selectable element being associated with a document that is managed by the content collaboration system (e.g., a native document), the content collaboration system 112-1 may obtain (operation 306) document content of the document (e.g., from the data store 116-1). The document content may be formatted in accordance with a platform-specific structured data format. At operation 308, the document content may be displayed in the content panel of the GUI of the content collaboration system 112-1. For example, FIG. 2A illustrates document content of the document 202 displayed in the content panel 208.

In some cases, the selected selectable element may be associated with a remote content item that is managed by an external platform. For example, the selected selectable element may correspond to a data object that includes an address or other identifier of the remote content item. The data object may be created by a user supplying the address or other identifier of the remote content item to the content collaboration system, which may result in the creation of a data object (or optionally a document with renderable content, as described herein), and the display of the selectable element that corresponds to the data object in the hierarchical element tree. Upon selection of the selectable element, the data object may be accessed and operations may be performed to produce renderable content from the remote content item and display the renderable content, as described herein. In cases where the document with renderable content formatted in the platform-specific structured data format has already been produced for a selectable element, selection of the selectable element may cause the document to be accessed and its content displayed.

Returning to FIG. 3, in response to the selected selectable element (operation 304) being associated with a remote content item that is managed by an external platform separate from the content collaboration system (e.g., a remote content item), the content collaboration system 112-1 may perform a different set of operations. For example, the content collaboration system 112-1 may request renderable content from the remote source page generation service 110. At operation 310, the remote source page generation service 110 may select a content processing engine from a set of candidate content processing engines associated with the content collaboration system 112-1 and/or the application platform 102 (e.g., content processing engines 113). The selected content processing engine may be configured to process content from remote content items associated with the particular external platform of the remote content item referenced by the selectable element. For example, the selected selectable element may include an identifier (e.g., a URL) of a remote content item that is associated with a particular external platform. The particular external platform may be indicated by the URL or otherwise stored in a data object or document associated with the selected selectable element, and the remote source page generation service 110 may select the content processing engine based on the particular external platform.

At operation 312, the remote source page generation service 110 may retrieve content from the remote content item at an address associated with the remote content item (e.g., a URL stored in a data object or document associated with the selected selectable element). At operation 314, the remote source page generation service 110 may process the content from the remote content item using the selected processing engine to produce renderable content. As described herein, the renderable content may be formatted in accordance with the platform-specific structured data format, such that it can be displayed or rendered in the content panel of the GUI of the content collaboration system.

The processing of the content by the content processing engine may include identifying a content element (e.g., a video, a title, a comment list, text, computer code, an image, an audio source, etc.) from a plurality of content elements in the remote content item, extracting an address (e.g., a URL) of the identified content element, and including the address of the identified content element in the renderable content to cause display of the identified content element in the content panel. Thus, for example, the processing engine may identify a video source in the remote content item, and include an address of the video source in the renderable content, such that the video is displayed in the content panel of a GUI when the renderable content is displayed by the content collaboration system 112-1.

At operation 316, the renderable content is displayed in the content panel. For example, FIG. 2E illustrates the renderable content being displayed in the content panel 208 of the GUI 200 of the content collaboration system 112-1.

In some cases, operations 310-316 are performed in response to receiving a document creation request. Thus, for example, when a document creation request that includes an address to a remote content item is received (e.g., as shown and described in FIG. 2C), operations 310-316 may be performed, and a document (which includes the renderable content produced at operation 314) may be generated. Additionally, as described herein, a selectable element corresponding to the document may be displayed in the hierarchical element tree.

In some cases, upon receiving a document creation request that includes an address to a remote content item, a data object is created. The data object may not include renderable content, but may instead be configured to initiate the generation and display of renderable content, such as with the operations 310-316. For example, the data object may include the address to the remote content item and any other instructions or identifiers that will cause the content collaboration system to, upon receiving an instruction to access the data object, perform the operations 310-316.

In some cases, the data object (which may be or may resemble an at least partially complete document) may include some renderable content, and some content that will cause the content collaboration system to perform operations 310-316 to produce additional renderable content for display. For example, after the content collaboration system performs the operations 310-316 for a given remote content item, it may generate a data object or document that includes certain content elements from the remote content item as renderable content, and also includes data or instructions that will initiate additional processing of the remote content item. Thus, some of the renderable content from the initial processing of a remote content item may be stored in the document (e.g., locally by the content collaboration system) and simply rendered by the content collaboration system when the document is displayed, while other content is retrieved from the remote content item and processed for rendering each time the document is displayed. As a particular example, the initial processing of a remote content item may include identifying a title of the remote content item (from the remote content item itself), and identifying text content in the remote content item. The title may be converted into renderable content in the platform-specific structured data format and stored in the generated data object, such that rendering the document causes the previously-generated title to be displayed. By contrast, the text content may not be converted into renderable content, but rather the document may include an instruction or other programmatic element that causes the remote content item to be processed (e.g., by a content processing engine) to produce renderable content from the text content. In this way, some portions of the document may be retrieved from the remote content item and rendered in real-time (e.g., in response to each request to display the document), while other portions may be contained in the document in a pre-processed, renderable format. Content that is contained in the document in a pre-processed, renderable format (e.g., titles) may be modifiable by users of the content collaboration system, as described herein.

Figure 4:
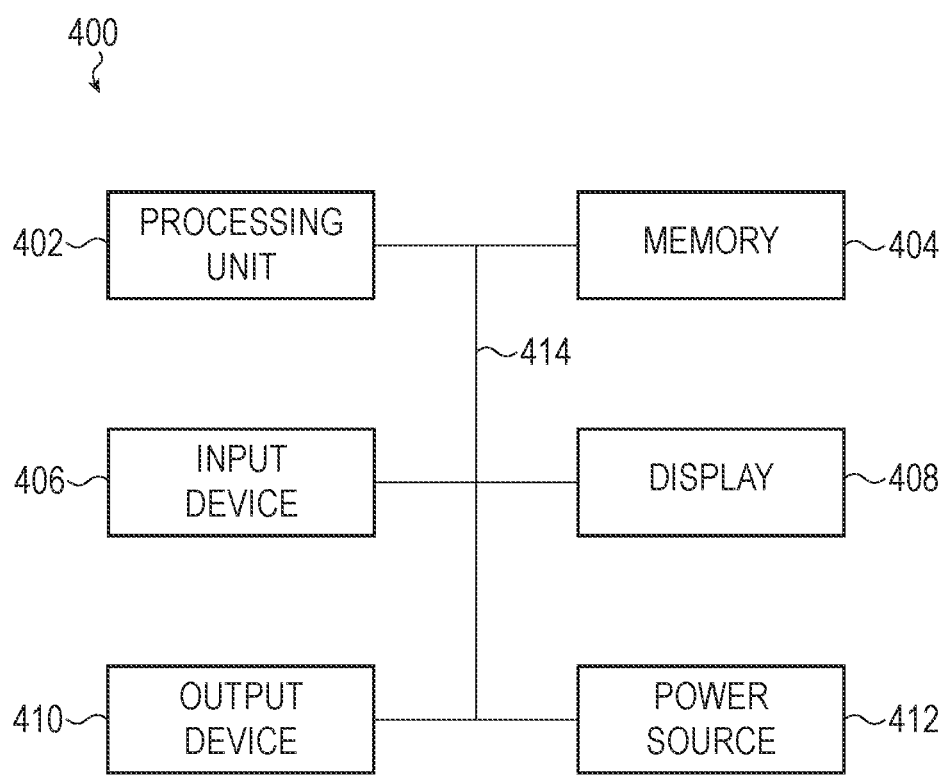
FIG. 4 depicts an example electrical block diagram of an electronic device that may perform the operations described herein.

FIG. 4 illustrates a sample electrical block diagram of an electronic device 400 that may perform the operations described herein. The electronic device 400 may in some cases take the form of any of the electronic devices described with reference to FIGS. 1-3, including client devices 104 and/or servers or other computing devices associated with the networked computer system 100 (e.g., the application platform 102, software applications 112, the remote source page generation service 110, remote content sources 108, etc.). The electronic device 400 can include one or more of a display 408, a processing unit 402, a power source 412, a memory 404 or storage device, input devices 406, and output devices 410. In some cases, various implementations of the electronic device 400 may lack some or all of these components and/or include additional or alternative components.

The processing unit 402 can control some or all of the operations of the electronic device 400. The processing unit 402 can communicate, either directly or indirectly, with some or all of the components of the electronic device 400. For example, a system bus or other communication mechanism 414 can provide communication between the processing unit 402, the power source 412, the memory 404, the input device(s) 406, and the output device(s) 410.

The processing unit 402 can be implemented as any electronic device capable of processing, receiving, or transmitting data or instructions. For example, the processing unit 402 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 400 can be controlled by multiple processing units. For example, select components of the electronic device 400 (e.g., an input device 406) may be controlled by a first processing unit and other components of the electronic device 400 (e.g., the display 408) may be controlled by a second processing unit, where the first and second processing units may or may not be in communication with each other.

The power source 412 can be implemented with any device capable of providing energy to the electronic device 400. For example, the power source 412 may be one or more batteries or rechargeable batteries. Additionally or alternatively, the power source 412 can be a power connector or power cord that connects the electronic device 400 to another power source, such as a wall outlet.

The memory 404 can store electronic data that can be used by the electronic device 400. For example, the memory 404 can store electronic data or content such as, for example, audio and video files, documents and applications, device settings and user preferences, timing signals, control signals, and data structures or databases. The memory 404 can be configured as any type of memory. By way of example only, the memory 404 can be implemented as random access memory, read-only memory, Flash memory, removable memory, other types of storage elements, or combinations of such devices.

In various embodiments, the display 408 provides a graphical output, for example associated with an operating system, user interface, and/or applications of the electronic device 400 (e.g., a graphical user interface associated with a content collaboration system, which may include graphical elements related to displaying documents, receiving document creation requests, receiving and displaying user-generated modifications of documents, displaying a workspace and/or document hierarchy, etc.). In one embodiment, the display 408 includes one or more sensors and is configured as a touch-sensitive (e.g., single-touch, multi-touch) and/or force-sensitive display to receive inputs from a user. For example, the display 408 may be integrated with a touch sensor (e.g., a capacitive touch sensor) and/or a force sensor to provide a touch- and/or force-sensitive display. The display 408 is operably coupled to the processing unit 402 of the electronic device 400.

The display 408 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 408 is positioned beneath and viewable through a cover that forms at least a portion of an enclosure of the electronic device 400.

In various embodiments, the input devices 406 may include any suitable components for detecting inputs. Examples of input devices 406 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 406 may be configured to detect one or more particular types of input and provide a signal (e.g., an input signal) corresponding to the detected input. The signal may be provided, for example, to the processing unit 402.

As discussed above, in some cases, the input device(s) 406 include a touch sensor (e.g., a capacitive touch sensor) integrated with the display 408 to provide a touch-sensitive display. Similarly, in some cases, the input device(s) 406 include a force sensor (e.g., a capacitive force sensor) integrated with the display 408 to provide a force-sensitive display.

The output devices 410 may include any suitable components for providing outputs. Examples of output devices 410 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 410 may be configured to receive one or more signals (e.g., an output signal provided by the processing unit 402) and provide an output corresponding to the signal.

In some cases, input devices 406 and output devices 410 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 402 may be operably coupled to the input devices 406 and the output devices 410. The processing unit 402 may be adapted to exchange signals with the input devices 406 and the output devices 410. For example, the processing unit 402 may receive an input signal from an input device 406 that corresponds to an input detected by the input device 406. The processing unit 402 may interpret the received input signal to determine whether to provide and/or change one or more outputs in response to the input signal. The processing unit 402 may then send an output signal to one or more of the output devices 410, to provide and/or change outputs as appropriate.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A method comprising, in a content collaboration system comprising a plurality of user-generated documents:
   causing a client computer to display a graphical user interface including:
      a content panel configured to display content of a selected content item; and
      a navigational panel including a hierarchical element tree, the hierarchical element tree comprising a plurality of hierarchically arranged selectable elements, each respective selectable element being selectable to cause display of respective content associated with the respective selectable element in the content panel;
   in response to a selection of a selectable element in the hierarchical element tree and in accordance with the selected selectable element being associated with a document that is managed by the content collaboration system:
      obtaining document content of the document from the content collaboration system, the document content formatted in accordance with a platform-specific structured data format; and
      causing display of the document content in the content panel; and
   in response to the selection of the selectable element in the hierarchical element tree and in accordance with the selected selectable element being associated with a remote content item that is managed by an external platform separate from the content collaboration system:
      selecting a content processing engine from a set of candidate content processing engines accessible to the content collaboration system, the content processing engine configured to process content from remote content items associated with the external platform;
      retrieving content from the remote content item at the external platform and using an address associated with the remote content item;
      processing the content from the remote content item using the selected content processing engine to produce renderable content, the renderable content formatted in accordance with the platform-specific structured data format; and
      causing display of the renderable content in the content panel.

2. The method of claim 1, wherein the method further comprises, in response to a user input moving the selectable element from a first position to a second position within the hierarchical element tree, modifying a hierarchical relationship between a data object associated with the selectable element and other content items associated with other selectable elements in the hierarchical element tree.

3. The method of claim 1, further comprising, while the renderable content is displayed in the content panel:
   receiving user-generated content for display with the renderable content; and
   storing the user-generated content in association with the renderable content.

4. The method of claim 3, further comprising, in response to receiving the user-generated content, sending the user-generated content to the external platform, thereby causing the external platform to incorporate the user-generated content in the remote content item.

5. The method of claim 1, further comprising, while the document content is displayed in the content panel, and in response to a request to edit the document:
   transitioning the content panel from a view mode to an edit mode;
   receiving a modification to the document in the content panel; and
   storing the modification in association with the document.

6. The method of claim 1, wherein:
   the remote content item is a first remote content item;
   the external platform is a first external platform;
   the content processing engine is a first content processing engine;
   the renderable content is first renderable content;
   each respective candidate content processing engine is configured to process content from different respective external platforms; and
   the method further comprises, in accordance with the selected selectable element being associated with a second remote content item that is managed by a second external platform separate from the content collaboration system:
      selecting a second content processing engine configured to process content from remote content items associated with the second external platform;
      retrieving content from the second remote content item from the second external platform using an address associated with the second remote content item;
      processing the content from the second remote content item using the selected second contentprocessing engine to produce second renderable content, the second renderable content formatted in accordance with the platform-specific structured data format; and
      causing display of the second renderable content in the content panel.

7. The method of claim 1, wherein the renderable content has a different appearance, when displayed in the graphical user interface of the content collaboration system, than the remote content item, when displayed in a graphical user interface of the external platform.

8. The method of claim 1, wherein:
the renderable content comprises an identifier of a video source identified in the content of the remote content item; and
causing display of the renderable content in the content panel comprises causing display of the video source in the content panel.

9. A method comprising, in a content collaboration system comprising a plurality of user-generated documents formatted in accordance with a platform-specific structured data format:
causing a client computer to display a graphical user interface including:
a content panel configured to display content of a selected content item; and
a navigational panel including a hierarchical element tree, the hierarchical element tree comprising a plurality of hierarchically arranged selectable elements, each respective selectable element being selectable to cause display of respective content associated with the respective selectable element in the content panel;
in response to receiving a document creation request, the document creation request including an address to a remote content item, the remote content item managed by an external platform separate from the content collaboration system and having a format other than the platform-specific structured data format:
selecting a content processing engine from a set of candidate content processing engines associated with the content collaboration system, the content processing engine configured to process content from remote content items associated with the external platform;
retrieving content from the remote content item at an address associated with the remote content item;
processing the content from the remote content item using the selected content processing engine to produce renderable content, the renderable content formatted in accordance with the platform-specific structured data format;
generating a data object including the renderable content; and
causing a selectable element associated with the data object to be displayed in the hierarchical element tree; and
in response to receiving a selection of the selectable element:
obtaining the renderable content from the data object; and
causing the renderable content to be displayed in the content panel.

10. The method of claim 9, wherein processing the content from the remote content item using the selected content processing engine comprises:
extracting a title from the remote content item; and
assigning the title from the remote content item as a title of the data object.

11. The method of claim 10, further comprising:
receiving a user-generated title for the data object; and
replacing the assigned title of the data object with the user-generated title.

12. The method of claim 9, wherein:
the document creation request is received while content of a local document that is managed by the content collaboration system is displayed in the content panel, the local document associated with a position in the hierarchical element tree; and
the method further comprises associating the data object with the position in the hierarchical element tree.

13. The method of claim 12, further comprising, in response to a user input moving the selectable element associated with the data object to a different position within the displayed hierarchical element tree, changing a hierarchical relationship between the data object and other documents in the content collaboration system.

14. The method of claim 9, further comprising:
while the renderable content is displayed in the content panel:
receiving user-generated content for display with the renderable content; and
storing the user-generated content in association with the data object.

15. The method of claim 14, wherein the user-generated content is at least one of a title, a text comment, or an image.

16. The method of claim 9, wherein selecting the content processing engine from the set of candidate content processing engines comprises determining an identity of the external platform based at least in part on an address included in the document creation request.

17. A computer system comprising:
at least one processor; and
at least one memory storing instructions, which when executed by the at least one processor, cause the at least one processor to perform operations comprising:
causing a client computer to display a graphical user interface including:
a content panel configured to display content of a selected content item; and
a navigational panel including a hierarchical element tree, the hierarchical element tree comprising a plurality of hierarchically arranged selectable elements, each respective selectable element being selectable to cause display of respective content associated with the respective selectable element in the content panel;
in response to receiving a selection of a selectable element in the hierarchical element tree and in accordance with the selected selectable element being associated with a document that is managed by a content collaboration system:
obtaining document content of the document, the document content formatted in accordance with a platform-specific structured data format; and
causing display of the document content in the content panel; and
in response to receiving the selection of the selectable element in the hierarchical element tree and in accordance with the selected selectable element being associated with a remote content item that is managed by an external platform separate from the content collaboration system:
selecting a content processing engine from a set of candidate content processing engines associated with the content collaboration system, the content processing engine configured to process content from remote content items associated with the external platform;
retrieving content from the remote content item at an address associated with the remote content item;
processing the content from the remote content item using the selected content processing engine to produce renderable content, the renderable content formatted in accordance with the platform-specific structured data format; and causing display of the renderable content in the content panel.

18. The computer system of claim 17, wherein:

the selectable element in the hierarchical element tree has a hierarchical relationship to other selectable elements in the hierarchical element tree; and the operations further comprise, in response to a user input to move the selectable element within the hierarchical element tree, associating a data object associated with the selectable element with a different position in the hierarchical element tree.

19. The computer system of claim 17, the operations further comprising, while the renderable content is displayed in the content panel:

receiving user-generated content for display with the renderable content; and storing the user-generated content in association with the renderable content.

20. The computer system of claim 19, the operations further comprising, in response to receiving the user-generated content, sending the user-generated content to the external platform, thereby causing the external platform to incorporate the user-generated content in the remote content item.

* * * * *